United States Patent
Godart

(10) Patent No.: US 11,821,055 B2
(45) Date of Patent: Nov. 21, 2023

(54) ARTICLES AND METHODS FOR PROCESSING SCRAP ALUMINUM

(71) Applicant: Massachusetts Institute of Technology, Cambridge, MA (US)

(72) Inventor: Peter Godart, Cambridge, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 17/464,949

(22) Filed: Sep. 2, 2021

(65) Prior Publication Data

US 2022/0074023 A1 Mar. 10, 2022

Related U.S. Application Data

(60) Provisional application No. 63/075,783, filed on Sep. 8, 2020.

(51) Int. Cl.
| | | |
|---|---|---|
| *C22B 21/00* | (2006.01) | |
| *C22B 7/00* | (2006.01) | |
| *B09B 3/80* | (2022.01) | |

(52) U.S. Cl.
CPC ............ *C22B 21/0007* (2013.01); *B09B 3/80* (2022.01); *C22B 7/00* (2013.01)

(58) Field of Classification Search
CPC ....... C22B 21/0007; C22B 7/00; C22B 7/005; B09B 3/80; B09B 3/40; Y02P 10/20; C22C 1/0416; C22C 1/0483; B22F 9/04; C01B 3/08; C23C 2/02; C23C 2/04; C23C 2/14; H01M 8/04216; H01M 8/065; Y02E 60/36; Y02E 60/50
USPC .................................... 75/403; 423/657
See application file for complete search history.

(56) References Cited

U.S. PATENT DOCUMENTS

| | | |
|---|---|---|
| 10,745,789 B2 | 8/2020 | Slocum |
| 11,268,180 B2 | 3/2022 | Slocum |
| 2019/0024216 A1* | 1/2019 | Giri .......................... C01B 3/08 |
| 2020/0199728 A1 | 6/2020 | Slocum |

OTHER PUBLICATIONS

ASM Handbook, "Forming of Aluminum Alloys" vol. 2A (2018) (Year: 2018).*
Solvay "Introduction to PVDF Coatings" (2015) (Year: 2015).*
Linetec "Fabricating after finishing" (Sep. 17, 2012) (Year: 2012).*
Godart et al., Aluminum-powered climate change resiliency: from aluminum debris to electricity and clean water. Appl Energy. 2020; 275: 115316.

* cited by examiner

*Primary Examiner* — Brian D Walck
*Assistant Examiner* — Danielle Carda
(74) *Attorney, Agent, or Firm* — Wolf, Greenfield & Sacks, P.C.

(57) ABSTRACT

Articles and methods for processing aluminum are generally described. The aluminum can include compositions of gallium and/or indium such that the aluminum is activated to react with water.

21 Claims, 5 Drawing Sheets

ARTICLES AND METHODS FOR PROCESSING SCRAP ALUMINUM

RELATED APPLICATIONS

This application claims the benefit under 35 U.S.C. § 119(e) of U.S. provisional application Ser. No. 63/075,783, filed Sep. 8, 2020, the disclosure of which is incorporated herein by reference in its entirety.

TECHNICAL FIELD

Articles and methods for processing recycled or scrap aluminum are generally described.

BACKGROUND

Aluminum is a commonly used metal in the production of electronic devices, structural components, and consumables, such as aluminum cans used for consuming beverages. Aluminum can be recycled and is generally sorted into various grades for recycling purposes to avoid contamination of the individual streams of aluminum.

SUMMARY

Articles and methods for processing recycled aluminum (e.g., scrap aluminum) are described herein. The subject matter of the present disclosure involves, in some cases, interrelated products, alternative solutions to a particular problem, and/or a plurality of different uses of one or more systems and/or articles.

In one aspect, an article comprising at least one layer with a first surface and a second surface opposite the first surface is described, wherein the at least one layer comprises aluminum and at least one selected from the group of gallium and indium, and wherein the at least one layer comprises one or more bends such that the at least one or more layers forms a non-planar surface.

In another aspect, an article comprising at least one layer comprising a first surface and a second surface opposite the first surface, wherein the at least one layer comprises aluminum and at least one selected from the group of indium and gallium, at least one polymeric coating disposed on the first and/or second surface of the layer, and a plurality of defects formed in the at least one polymeric coating is described.

In different aspect, a method of processing aluminum scrap is described, the method comprising fragmenting a layer comprising aluminum into a plurality of fragments, compacting the plurality of fragments to form a pellet, and exposing the pellet to a liquid composition including gallium and/or indium.

Other advantages and novel features of the present disclosure will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present disclosure will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
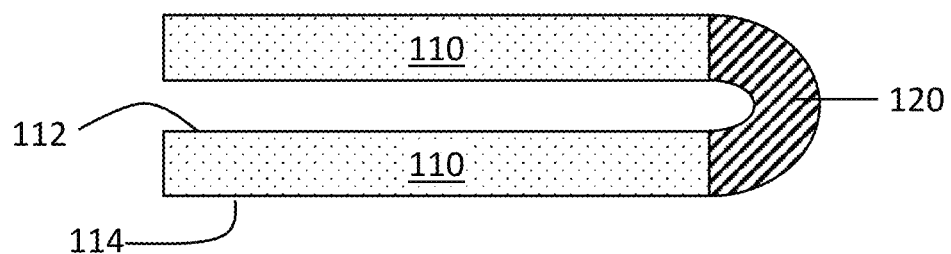
FIGS. 1A-1B are schematic diagrams of aluminum-containing layers including one or more bends, according to some embodiments.

Aluminum can be recycled by separating and sorting the aluminum and reusing the metal in various applications. However, it may also be reacted, for example, with water in order to obtain useful products, such as thermal energy, hydrogen gas, and useful aluminum products such as aluminum oxyhydroxide, aluminum hydroxide, and aluminum oxide. While pure aluminum metal is reactive with water, aluminum metal quickly forms an oxide coating (e.g., aluminum oxide) when exposed to air and/or other oxidizing environments that prevents the aluminum from further reaction and may prevent the aluminum-water reaction from proceeding. Additionally, aluminum products are often coated with a polymeric coating (e.g., paint), which may further inhibit reactions with the underlying aluminum metal.

The Inventor has recognized that certain compositions including gallium and/or indium may be used to process streams of recycled or scrap aluminum. Compositions containing gallium and/or indium, such as gallium-indium alloys, may penetrate and embrittle the aluminum, activating the aluminum to be more reactive towards water. However, the gallium and/or indium-containing compositions may be unable to penetrate coatings (e.g., a polymeric coating) disposed on an exterior surface of the aluminum metal. Thus in order to process a layer or a material including aluminum, it may be desirable to penetrate, remove, or otherwise disrupt any coatings disposed on the one or more surfaces of the aluminum in order to expose or access the underlying aluminum metal. In other words, using a layer or object made of aluminum and exposing it to an activating composition including gallium and/or indium may not be sufficient to activate the underlying aluminum due to the presence of these surface coatings.

It has been recognized and appreciated by the Inventor the benefits of processing recycled aluminum such that the underlying aluminum metal can be readily exposed to compositions including gallium and/or indium (e.g., gallium-indium alloys). Given a layer comprising aluminum and a polymeric coating disposed on one or more surfaces of the layer, exposing the layer to a gallium and/or indium composition may result in edge dissolution of the aluminum due to the polymeric coating blocking the composition from interacting with the bulk of the aluminum layer. This may prevent the bulk incorporation of aluminum with a composition (e.g., a gallium and/or indium activating composition). However, it has been discovered by the Inventor as described in this disclosure that a layer comprising aluminum can be folded or bent to form defects in the polymeric coating or any other barrier present on the surface of an aluminum structure. The presence of these defects in the coating may provide access to the bulk aluminum of a layer such that an activating composition of gallium and/or indium can penetrate through the polymeric coating or other barrier present on the surface of the aluminum. In other words, one or more layers comprising aluminum may include bends, which can form defects in a polymeric layer disposed on the one or more surfaces of the one or more layers such that the bent layers can more easily react with activating compositions including gallium and/or indium. In some instances, the one or more layers may be compressed together such that once compressed, the plurality of layers may form a tortuous network of interlocking layers, such that many defects are created in the one or more layers, which may further facilitate the ability of activating composition to permeate the aluminum of the layers. As elaborated on below, in some instances, the composition comprising gallium and/or indium is a liquid eutectic mixture of gallium and indium and may permeate the grain boundaries of the aluminum of the layers through the defects created in the polymeric coating.

In some embodiments, recyclable or scrap aluminum may be fragmented (e.g., shredded) to create a plurality of fragments comprising aluminum. Fragmenting may also create some defects in the aluminum (e.g., a layer comprising aluminum). The fragments may be compressed together in a die to create a pellet, such that the pellet may contain multiple layers compressed together with defects present between these layers. Compressing may also create bends in the layers of compressed fragments within the pellet, which may create more defects in the layer and/or a polymeric coating, or other barrier coating, disposed on the layer. The pellet may be exposed to a liquid composition including gallium and/or indium, and the defects may permit the liquid composition including gallium and/or indium to better permeate through the bulk of the layers within the compressed pellet. Details regarding the layers and other above-described features are described below.

As mentioned above, articles and methods described herein may include at least one layer. Each of the layers may comprise aluminum and at least one selected from the group of gallium and indium. The layer may comprise one or more surfaces (e.g., a first surface, a second surface). For example, some embodiments include at least one layer with a first surface and a second opposing surface. However, it should be understood that the layers can include many surface (e.g., a third surface, a fourth surface, a fifth surface), and in some cases, at least some of the surfaces are not opposing surfaces to a particular surface. In some embodiments, the layers may bend to form a tortuous network of layers and may include many bends of the layers, which may, in some such embodiments, be an irregular or random network of bends lacking any particular long-range order in the network. Within this network of bent, irregular layers, there may also be a plurality of defects formed in one or more coatings disposed on the bent layers of aluminum as described above.

In some embodiments, the layer can also include compositions of gallium and/or indium. Compositions of gallium and/or indium (e.g., a gallium-indium alloy, a gallium-indium eutectic mixture) may permeate into the grain boundaries and/or subgrain boundaries of an aluminum-containing layer, which may facilitate its reaction with water. For example, a layer may include aluminum combined with gallium and/or indium. In some instances, the composition of gallium and/or aluminum can serve as an activating composition for the aluminum and may be a eutectic, or close-to eutectic composition, including for example a eutectic composition of gallium and indium. In one such embodiment, the gallium-indium composition may comprise gallium and indium where the portion of the composition may have a composition of about 70 weight percent (wt. %) to 80 wt. % gallium and 20 wt. % to 30 wt. % indium relative to the total amount of the gallium-indium composition, though other weight percentages are also possible. Without wishing to be bound by theory, gallium and/or indium may permeate through the one or more grain boundaries and/or subgrain boundaries of the layer (e.g., aluminum of the layer). For instance, the gallium and/or indium of the layer may be incorporated into an alloy with the aluminum. The alloy may comprise any composition of gallium and/or indium in any of a variety of suitable amounts. In some embodiments, for example, the alloy (e.g., the aluminum-containing alloy) comprises greater than or equal to 0.1 wt. %, greater than or equal to 1 wt. %, greater than or equal to 5 wt. %, greater than or equal to 15 wt. %, greater than or equal to 30 wt. %, or greater than or equal to 45 wt. % of the composition of gallium and/or indium based on the total weight of the alloy. In certain embodiments, the alloy comprises less than or equal to 50 wt. %, less than or equal to 40 wt. %, less than or equal to 30 wt. %, less than or equal to 20 wt. %, less than or equal to 10 wt. %, less than or equal to 5 wt. %, or less than or equal to 1 wt. % of gallium and/or indium based on the total weight of the alloy. Combinations of the above-recited ranges are also possible (e.g., the alloy comprises greater than or equal to 0.1 wt. % and less than or equal to 50 wt. % of the activating composition based on the total weight of the alloy, the alloy comprises greater than or equal to 1 wt. % and less than or equal to 10 wt. % of the gallium and/or indium composition based on the total weight of alloy). Other ranges are also possible.

Depending on the particular embodiment, an aluminum-containing layer or material may be provided in a plate, a panel, a can or other layer-like structure where a thickness of the material is substantially less than an overall size and shape of the aluminum structure in one or more other dimensions. In some embodiments, a thickness of the layer of aluminum material may be greater than or equal to 0.05 mm, 0.1 mm, 0.5 mm, 1.0 mm, 2.0 mm, 3.0 mm, and/or any other appropriate thickness. Correspondingly, a thickness of the layer of aluminum material may be less than or equal to 5.0 mm, 4.0 mm, 3.0 mm, 2.0 mm, 1.0 mm, and/or any other appropriate thickness. Combinations of the foregoing are contemplated including, for example, a thickness of a layer of aluminum material may be between or equal to 0.05 mm and 5.0 mm. Of course, thicknesses both greater than and less than those noted above are also contemplated as the disclosure is not so limited.

In some embodiments, the at least one layer comprising aluminum may have a particular aspect ratio. The aspect ratio may be measured as a ratio of a length or width of the layer to the thickness of the layer. In some embodiments, the aspect ratio of at least one layer is greater than or equal to 1:1, greater than or equal to 2:1, greater than or equal to 3:1, greater than or equal to 4:1, greater than or equal to 5:1, greater than or equal to 10:1, or greater than or equal to 20:1. In some embodiment, the aspect ratio of the at least one layer is less than or equal to 20:1, less than or equal to 10:1, less than or equal to 5:1, less than or equal to 4:1, less than or equal to 3:1, less than or equal to 2:1, or less than or equal to 1:1. Combinations of the above-referenced ranges are also possible (e.g., greater than or equal to 1:1 and less than or equal to 5:1). Other ranges are possible. Providing a particular aspect ratio may facilitate the permeation of a gallium and/or indium composition into the layer.

At least one polymeric coating may be disposed on one or more surfaces of a layer comprising aluminum. For example, at least one or more polymeric coatings may be disposed on a first and/or second surface of the layer. The polymeric coating may comprise a variety of polymeric materials, such as paints and plastics used for protecting the surface, applying graphics and/or colors to a surface, and/or any number of other applications for aluminum products. In some embodiments, the polymeric material comprises a plastic such as polyethylene, polypropylene, polyester, styrene, acrylic, vinyl, and/or phenolic resins, without limitation. In some embodiments, the polymeric coating comprises an epoxy resin.

As noted above, a polymeric coating may hinder permeation of compositions comprising gallium and/or indium into the aluminum (e.g., aluminum grain boundaries) of a layer. Accordingly, articles and methods described herein may advantageously create defects in the polymeric coating through the introduction of bends, abraded surfaces, and/or other mechanical damage such that activating compositions discussed herein may permeate though the aluminum of the layer. Bends and the corresponding defects that may be formed are described further below and elsewhere herein.

Bends may be present or formed in at least one layer, and in some instances a majority or substantially all of the layers within a compacted structure. These bends may also be present in the at least one polymeric coating disposed on the layers of aluminum. The presence of the one or more bends may strain (e.g., tensile strain, compressive strain) the at least one layer and/or the at least one polymeric coating disposed thereon, which may create defects in the layer and/or the polymeric coating. Accordingly, in some embodiments, at least a portion of the one or more bends comprises a defect. The bends in the layer or the polymeric coating may create a network of bent and folded layers. In some embodiments, the at least one layer comprise one or more bends such that the at least one layer forms a non-planar surface. In some embodiments, the one or more bends are adapted and arranged such that at least a portion of the first surface is adjacent (e.g., directly adjacent) to at least a portion of the second surface. As described elsewhere herein, the bends may cause a plurality of interlocking layers that have been compacted together to form a tortuous network of the layers with corresponding polymeric coatings disposed on the interlocked layers.

It should be understood that when a portion (e.g., layer, structure, region) is "on", "adjacent", "above", "over", "overlying", or "supported by" another portion, it can be directly on the portion, or an intervening portion (e.g., layer, structure, region) may also be present. Similarly, when a portion is "below" or "underneath" another portion, it can be directly below the portion, or an intervening portion (e.g., layer, structure, region) may also be present. A portion that is "directly adjacent", "directly on", "immediately adjacent", "in contact with", or "directly supported by" another portion means that no intervening portion is present. It should also be understood that when a portion is referred to as being "on", "above", "adjacent", "over", "overlying", "in contact with", "below", or "supported by" another portion, it may cover the entire portion or a part of the portion.

As noted above, in some embodiments, at least one layer and/or at least one polymeric coating may include one or more defects. For example, the at least one layer and the at least one polymeric coating may comprise a bend and the bend may contain one or more defects. Alternatively, a surface of the coating may be abraded during a compaction process such that a defect is formed in a portion of the coating. Accordingly, it should be understood that the defects formed in the various layers or pellets disclosed herein may be formed during the formation process in any number of ways and that the disclosure is not limited to defects only being present at the locations were bends in any particular layer are present. That said, in some embodiments, a defect may be a crack, fracture, tear, a hole, or the like, and may be present in the at least one layer, the at least one polymeric coating, or both. The one or more defects may allow access of a gallium- and/or indium-containing composition to permeate to the aluminum of the at least one layer. That is to say, the defects may be permeable to a composition including gallium and/or indium (e.g., a gallium-indium eutectic mixture). In some embodiments, the one or more defects exposes at least a portion of the aluminum of the at least one layer, for example, so that the aluminum can be exposed to gallium and/or indium.

The articles and methods described herein may provide several advantages over current systems for recycling aluminum or processing scrap aluminum. As one advantage, the articles and methods described herein may increase the reactivity (e.g., towards water) of the aluminum within the layer(s) or of a pellet when compared to certain existing systems including unactivated aluminum. Further, in instances where recycled aluminum is exposed to an activating composition including gallium and/or indium without accounting for the presence of polymeric coatings on the recycled materials, the activated aluminum may react with water to produce about a 5% yield of an expected theoretical yield of hydrogen gas based on the amount of aluminum when the material is reacted with water. However, when the articles and methods described herein are used and account for the presence of polymeric coatings on the aluminum-containing materials, the activated aluminum materials may provide a yield of at least 95% of a theoretical yield of hydrogen gas when reacted with water. As another advantage, the articles and methods described herein may be used in penetrate one or more polymeric coatings rather than burning off or otherwise chemically removing the polymer coatings such that the polymeric coatings can be recovered whole and recycled, while also reducing emissions and thermal energy inputs required for burning. As yet another advantage, the articles and methods described herein may largely avoid the need to sort the aluminum by alloy type or grade because the articles and methods described herein can be applied to a wide variety of aluminum and aluminum alloys and may result in easily-purifiable, hydrated aluminum oxide products that can be fed into, for example, the Hall-Heroult process to produce pure, reduced aluminum.

The articles and methods described herein may find a variety of applications. For example, articles and methods herein may provide for a means of recycling aluminum. Aluminum is a common waste product in both consumer and industrial streams and hence there is a demand to recycle aluminum waste (e.g., scrap aluminum). In addition, aluminum scrap can also be produced as a result of natural disasters. The articles and methods described herein may enhance the recyclability of aluminum by including an activating composition including gallium and/or indium which can penetrate into the aluminum and increase its reactivity towards water. The reaction of aluminum with water is exothermic and can produce useful aluminum-containing products, in addition to thermal energy and hydrogen gas. The thermal energy may be used to produce steam, which can subsequently produce power, while the hydrogen gas can be collected and used to generate electricity via a fuel cell or combusted to power an energy generation process. The thermal energy may also be used to power thermal-driven desalination and water purification processes or increase the efficiency of an internal combustion engine. As another application, the aluminum-containing reaction products may also be collected. For example, aluminum oxyhydroxide, aluminum hydroxide, and aluminum oxide may be used in the manufacturing of pharmaceuticals, fire suppressants, antacids, antiperspirants, and in the production of aluminum from bauxite ore. Of course, other applications are possible as this disclosure is not so limited.

In view of the above, it should be understood that the aluminum-containing layers and materials used in the methods and articles described herein are not limited to any particular aluminum-containing material. Accordingly, the disclosed methods and articles may include any number of different materials that may be alloyed with the aluminum. Accordingly, references to aluminum and aluminum-containing materials or structures should be understood to refer to the use of either pure aluminum and/or aluminum alloys as the disclosure is not so limited. That said, in some embodiments, the materials referred to herein may, in some embodiments, include aluminum in a weight percentage that is greater than or equal to 40 wt. %, 50 wt. %, 60 wt. %, 70 wt. %, 80 wt. %, 90 wt. %, 95 wt. %, 99 wt %, 99.99 wt % and/or any other appropriate weight percentage of aluminum as the disclosure is not so limited.

Turning to the figures, specific non-limiting embodiments are described in further detail. It should be understood that the various articles, systems, components, features, and methods described relative to these embodiments may be used either individually and/or in any desired combination as the disclosure is not limited to only the specific embodiments described herein.

Referring now to FIG. 1A, an embodiment is depicted including an aluminum-containing layer 110 with a first surface 112 and an opposing second surface 114. The layer 110 also includes a bend 120. Bend 120 shapes layer 110 such that layer 110 includes at least a portion with a non-planar surface. In FIG. 1A, bend 120 also arranges layer 110 such that a first surface 112 is bent back on itself such that it is adjacent to another portion of the first surface 112. However, it should be noted that one or more bends may arrange the one or more layers such that the first surface and/or second surfaces are not directly adjacent to one another and other arrangements of the layer are possible. For example, the various surfaces may be bent and placed into contact with the surfaces of other layers in some embodiments. It should also be noted that the layer may include additional surfaces (e.g., a third surface, a fourth surface, a fifth surface) and these additional surfaces may be arranged in any suitable position and orientation relative to one another in the bent configuration.

Figure 1B:
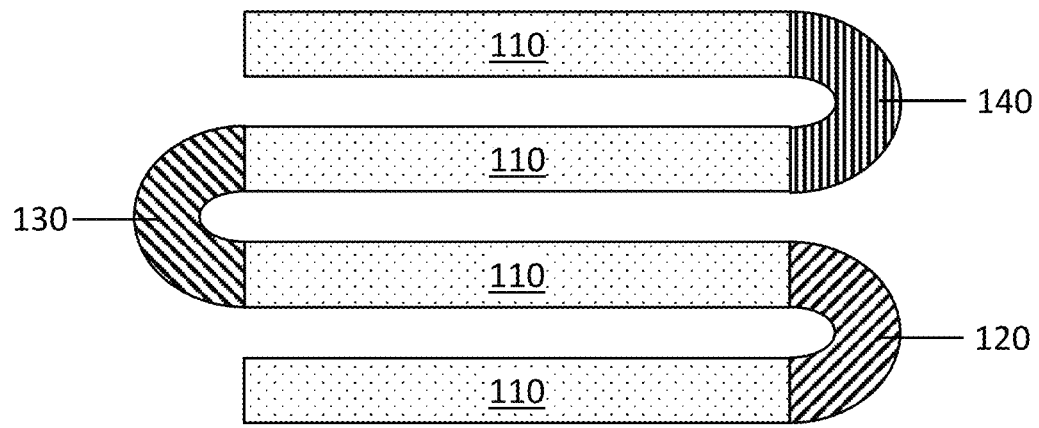

FIG. 1B schematically depicts an aluminum-containing layer with more than one bend. Specifically, an aluminum-containing layer 110 includes a first bend 120, a second bend 130, and a third bend 130. These bends deform the layer from an initial planar, or other initial, configuration to a deformed configuration which in the depicted embodiment is a serpentine or non-planar configuration with multiple portions of the various surfaces disposed adjacent to one another.

While a relatively regular deformation pattern is depicted in the illustrated deformed layer, embodiments in which a regular deformation patterns are introduced into the layers and/or in which multiple layers are deformed against one another are also contemplated as the depicted embodiment is shown for illustrative purposes and the disclosure is not so limited. Thus, it should be understood that, in some embodiments, more than one layer may be present. In some such embodiments, more than one layer may be adjacent (e.g., directly adjacent) to another layer and the one or more bends may fold or enmesh multiple layers together. As described elsewhere herein, in some embodiments, these one or more layers, or plurality of layers, may form a tortuous network where the one or more layers are compressed together. For example, one or more bends in one or more layers may form a tortuous network comprising one, more than one, or many layers.

Figure 2A:
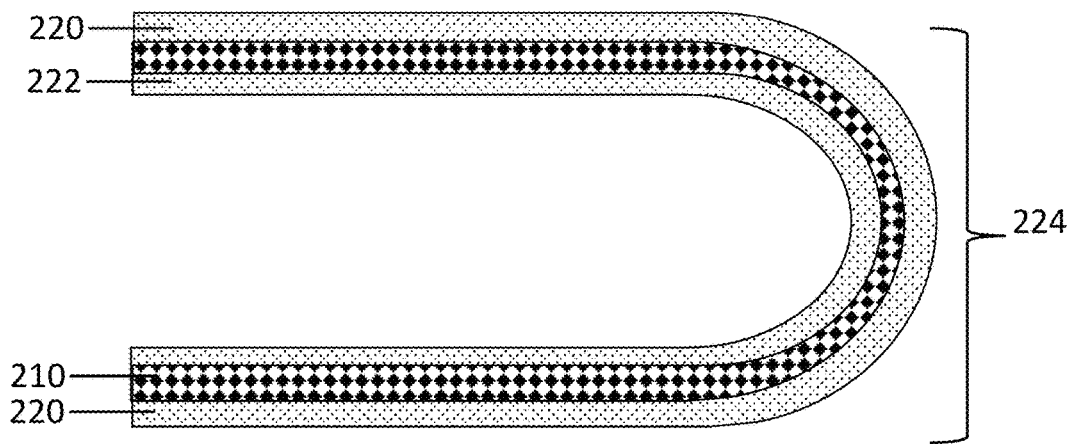
FIG. 2A is a schematic illustration of an aluminum-containing layer with a bend and at least one polymeric coating disposed on the layer, according to some embodiments.
Figure 2B:
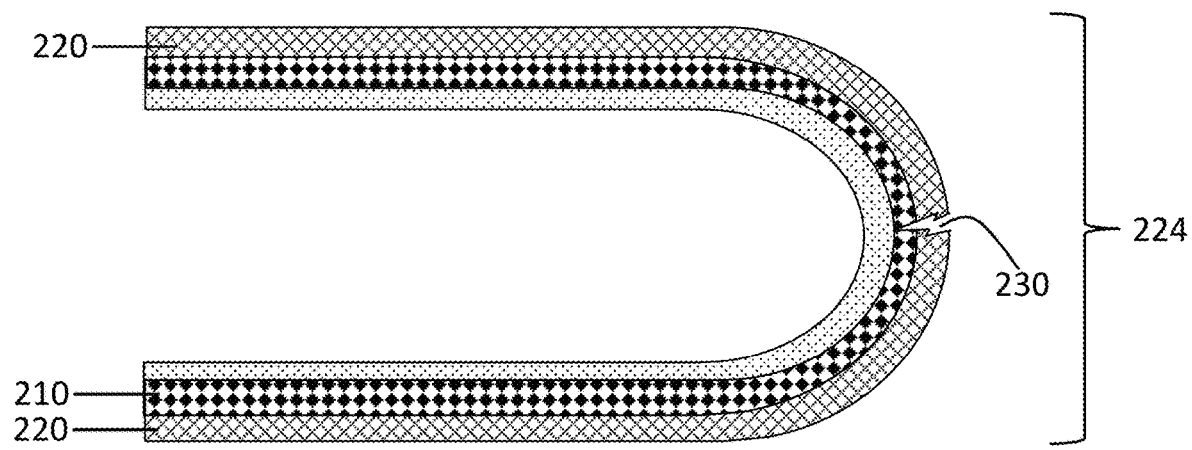
FIG. 2B is a schematic illustration of an aluminum-containing layer with at least one polymeric coating disposed on the layer and a defect present at a bend of the layer, according to some embodiments.

In reference to FIG. 2A, an aluminum-containing layer 210 is schematically shown and has polymeric coatings 220 and 222 disposed on opposing exterior surfaces of the layer 210. Layer 210 also includes bend 224, which also bends polymeric layers 220 and 222. The bend may strain the polymeric coating and/or the layer, such that a defect is formed. Depending on which surface the polymeric coating is located and the direction of the bend, the induced strain may either be a compressive or tensile strain. In either case, the bends may result in the formation of a plurality of defects in the coating, see for example a defect 230 formed in polymeric coating 220 and also in layer 210 within bend 224 in FIG. 2B. The defect may expose the aluminum of the layer through the polymeric coating which may permit a composition (e.g., an activating composition) including gallium and/or indium to permeate through the defect and into the underlying aluminum of the bulk layer(s). Again, while FIG. 2B shows one defect, it should be understood that more than one defect may be present in the polymeric coating and/or the layer comprising aluminum. It will also be understood that while the defect is shown within a bend, a defect may be present at any position of the polymeric coating and/or the layer.

Figure 3A:
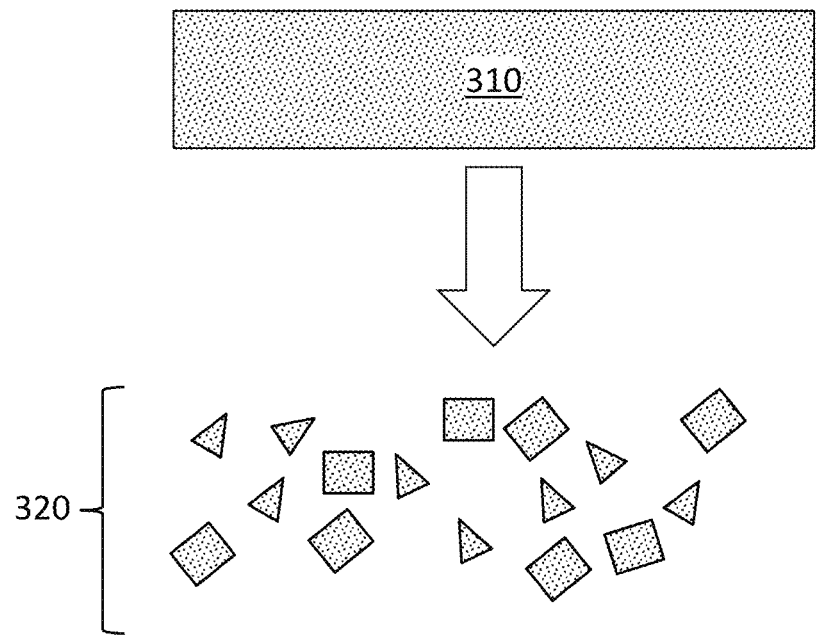
FIGS. 3A-3D schematically depict a method of fragmenting an aluminum-containing layer into a plurality of fragments and compacting these fragments into a pellet that may be permeated with a composition that includes gallium and/or indium, according to some embodiments.

In some embodiments, a method of processing a layer comprising aluminum (e.g., scrap aluminum) is described. In some embodiments, a layer containing aluminum is fragmented into a plurality of fragments. For example, as schematically illustrated in FIG. 3A, a layer 310 is fragmented into a plurality of fragments 320, which may have any desired shape depending on the desired properties of the final compacted material. For example, the fragments may have elongated, ribbon-like shapes, flakes, and/or any other appropriate shape and/or aspect ratio as the disclosure is not limited in this fashion.

Fragmenting a layer (e.g., a layer comprising aluminum) can be accomplished in a variety of ways. For example, the layer may be shredded, pulverized, ground, chopped, diced, and the like. Fragmenting the layer may also result in forming defects in the layer and/or a polymeric coating disposed on the layer. That is to say, in some embodiments, a polymeric coating is adjacent to the layer comprising aluminum and fragmenting the layer may form defects in the polymeric coating. Those skilled in the art based on the teachings of the present disclosure will be capable of selecting an appropriate technique for fragmenting the layer including, but not limited to, shredding, cutting, milling, and/or any other appropriate process capable of forming the desired fragments. In some embodiments, the plurality of fragments each comprise aluminum. In some embodiments, the plurality of fragments comprises flakes and/or ribbons of aluminum metal.

Figure 3B:
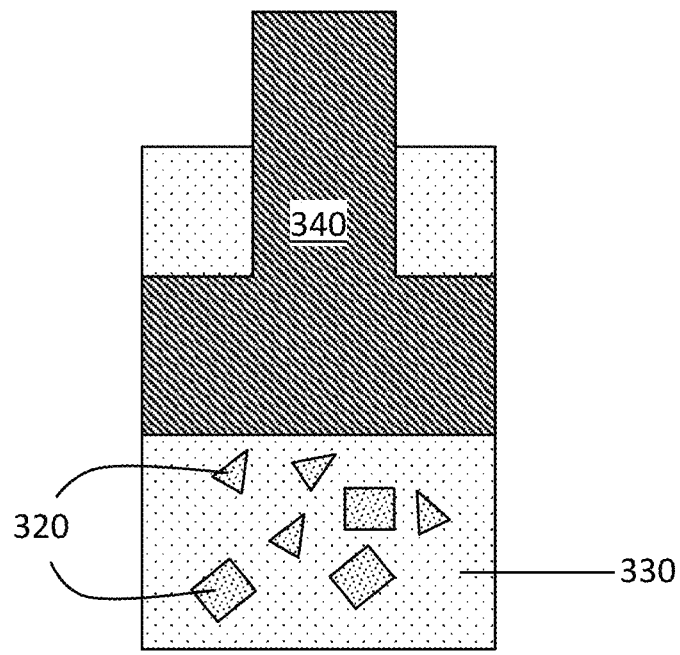
Figure 3C:
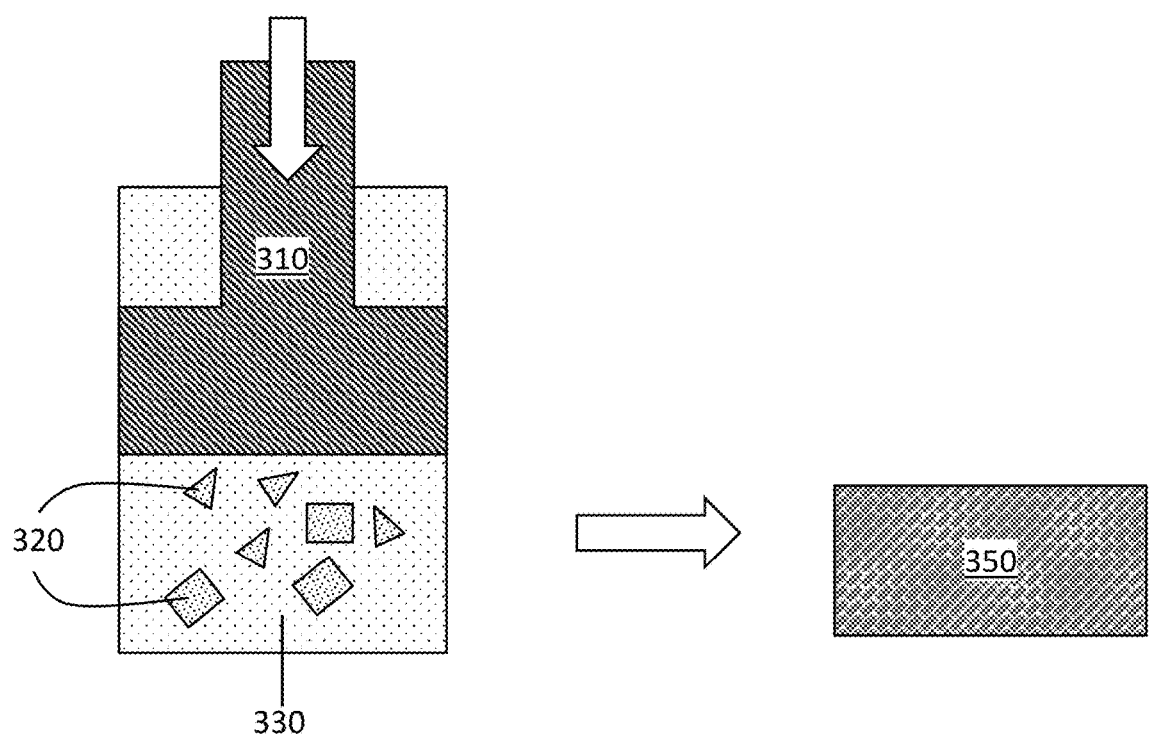

Some embodiments include compacting the plurality of fragments to form a pellet. For example, as shown in FIG. 3B, plurality of fragments 320 is loaded into a die 330. The plurality of fragments 320 can then be compacted by a press 340. Any suitable press can be used, such as a hydraulic press, a pneumatic press, an arbor press, and/or any other appropriate system capable of applying a compaction pressure to a volume of material to form the desired compacted pellets. In reference to FIG. 3C, press 340 is moved downward and compacts the plurality of fragments 320 to form a pellet 350. The press can form a plurality of bends in the plurality of fragments during the compaction process. As described previously above, the introduction of these bends and/or abrasions of the materials during the compaction process may also form more defects in the polymeric coatings, or other coatings, disposed on the surfaces of the fragments which may facilitate the exposure of the aluminum of the fragments to composition (e.g., an activating composition) including gallium and/or indium.

The size of the plurality of fragments (e.g., fragments comprising aluminum) may be sized such that bends form in the plurality of the fragments while compressing in a die. For example, fragments with sizes that are relatively large relative to a size of the mold (e.g., die) they are compacted in may have multiple folds introduced into them during a compaction process. Accordingly, in some embodiments, an average maximum dimension of the plurality of fragments may be greater than or equal to 100% of a cross-sectional transverse dimension (e.g. a diameter or width) of the die, greater than or equal to 150% of a cross-sectional transverse dimension of the die, greater than or equal to 200% of cross-sectional transverse dimension of the die, greater than or equal to 250% of cross-sectional transverse dimension of the die, or greater than or equal to 300% of cross-sectional transverse dimension of the die. In some embodiments, an average maximum dimension of the plurality of fragments is less than or equal to 300% of a cross-sectional transverse dimension of the die, less than or equal to 250% of a cross-sectional transverse dimension of the die, less than or equal to 200% of a cross-sectional transverse dimension of the die, less than or equal to 150% of a cross-sectional transverse dimension of the die, or less than or equal to 100% of a cross-sectional transverse dimension of the die. Combinations of the above-referenced ranges are also possible (e.g., greater than or equal to 100% of a cross-sectional transverse dimension of a die and less than or equal to 250% of a cross-sectional transverse dimension of the die). Other ranges are possible.

In some embodiments, the pellet has a particular average cross-sectional transverse dimension (e.g., a diameter or width). In some embodiments, the pellet has a particular average cross-sectional transverse dimension of less than or equal to 5 mm, less than or equal to 4.5 mm, less than or equal to 4 mm, less than or equal to 3.5 mm, less than or equal to 3 mm, less than or equal to 2.5 mm, less than or equal to 2 mm, less than or equal to 1.5 mm, less than or equal to 1 mm, or less than or equal to 0.5 mm. In some embodiments, the pellet has an average cross-sectional transverse dimension of greater than or equal to 0.5 mm, greater than or equal to 1 mm, greater than or equal to 1.5 mm, greater than or equal to 2 mm, greater than or equal to 2.5 mm, greater than or equal to 3 mm, greater than or equal to 3.5 mm, greater than or equal to 4 mm, greater than or equal to 4.5 mm, or greater than or equal to 5 mm. Combinations of the above-referenced ranges are also possible (e.g., greater than or equal to 1 mm and less than or equal to 5 mm). Other ranges are possible.

The pellet may be of a particular thickness. In some embodiments, the pellet has an average thickness of less than or equal to 5 mm, less than or equal to 4.5 mm, less than or equal to 4 mm, less than or equal to 3.5 mm, less than or equal to 3 mm, less than or equal to 2.5 mm, less than or equal to 2 mm, less than or equal to 1.5 mm, or less than or equal to 1 mm. In some embodiments, the pellet has an average thickness of greater than or equal to 1 mm, greater than or equal to 1.5 mm, greater than or equal to 2 mm, greater than or equal to 2.5 mm, greater than or equal to 3 mm, greater than or equal to 3.5 mm, greater than or equal to 4 mm, greater than or equal to 4.5 mm, or greater than or equal to 5 mm. Combinations of the above-referenced ranges are also possible (e.g., greater than or equal to 1 mm and less than or equal to 5 mm). Other ranges are possible.

In some embodiments, the pellet may have a particular mass. In some embodiments the pellet has a mass of greater than or equal to 0.3 g, greater than or equal to 0.4 g, greater than or equal to 0.5 g, greater than or equal to 1 g, greater than or equal to 1.5 g, greater than or equal to 2 g, greater than or equal to 2.5 g, greater than or equal to 3 g, greater than or equal to 3.5 g, greater than or equal to 4 g, greater than or equal to 4.5 g, or greater than or equal to 5 g. In some embodiments, the pellet has a mass of less than or equal to 5 g, less than or equal to 4.5 g, less than or equal to 4 g, less than or equal to 3.5 g, less than or equal to 3 g, less than or equal to 2.5 g, less than or equal to 2 g, less than or equal to 1.5 g, less than or equal to 1 g, less than or equal to 0.5 g, less than or equal to 0.4 g, or less than or equal to 0.3 g. Combinations of the above-referenced ranges are also possible (e.g., greater than or equal to 0.3 g and less than or equal to 5 g). Other ranges are possible.

Figure 3D:
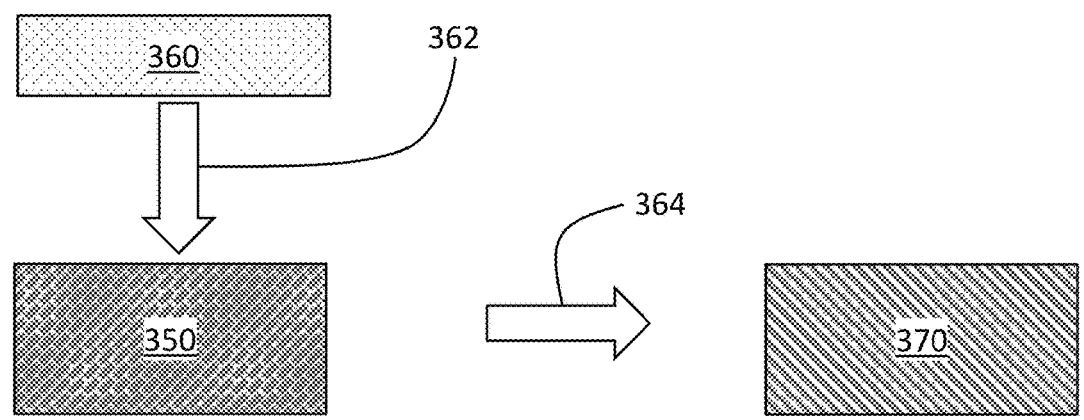

After forming the compacted pellet, it may be desirable to activate the compacted pellet (e.g., activate the aluminum of the compacted pellet) such that it is reactive with water. Accordingly, in some embodiments, one or more pellets are exposed to a composition including gallium and/or indium (e.g., a liquid composition of gallium and/or indium). Referring to FIG. 3D, pellet 350 is exposed to a volume of a composition including gallium and/or indium 360. The volume of the composition 360 may permeate or diffuse into the pellet as shown with permeation 360 in order to activate the pellet (e.g., aluminum of the pellet). Once activation 364 occurs, an activated pellet 370 is formed and contains activated aluminum. The activated aluminum may be more reactive, for example, towards water when compared to aluminum that has not be exposed to a composition of gallium and/or indium.

Exposing the pellet to a composition of gallium and/or indium may occur at any suitable temperature. In some embodiments, the temperature is selected to advantageously exclude water. In some embodiments, exposing the pellet to the composition occurs at a temperature of greater than or equal to 100° C., greater than or equal to 110° C., greater than or equal to 120° C., greater than or equal to 130° C., greater than or equal to 140° C., greater than or equal to 150° C., greater than or equal to 160° C., greater than or equal to 170° C., greater than or equal to 180° C., greater than or equal to 190° C., or greater than or equal to 200° C. In some embodiments, exposing the pellet to the composition occurs at a temperature of less than or equal to 200° C., less than or equal to 190° C., less than or equal to 180° C., less than or equal to 170° C., less than or equal to 160° C., less than or equal to 150° C., less than or equal to 140° C., less than or equal to 130° C., less than or equal to 120° C., less than or equal to 110° C., or less than or equal to 100° C. Combinations of the above-referenced ranges are also possible (e.g., greater than or equal to 100° C. and less than or equal to 130° C.). Other ranges are possible.

Figure 4:
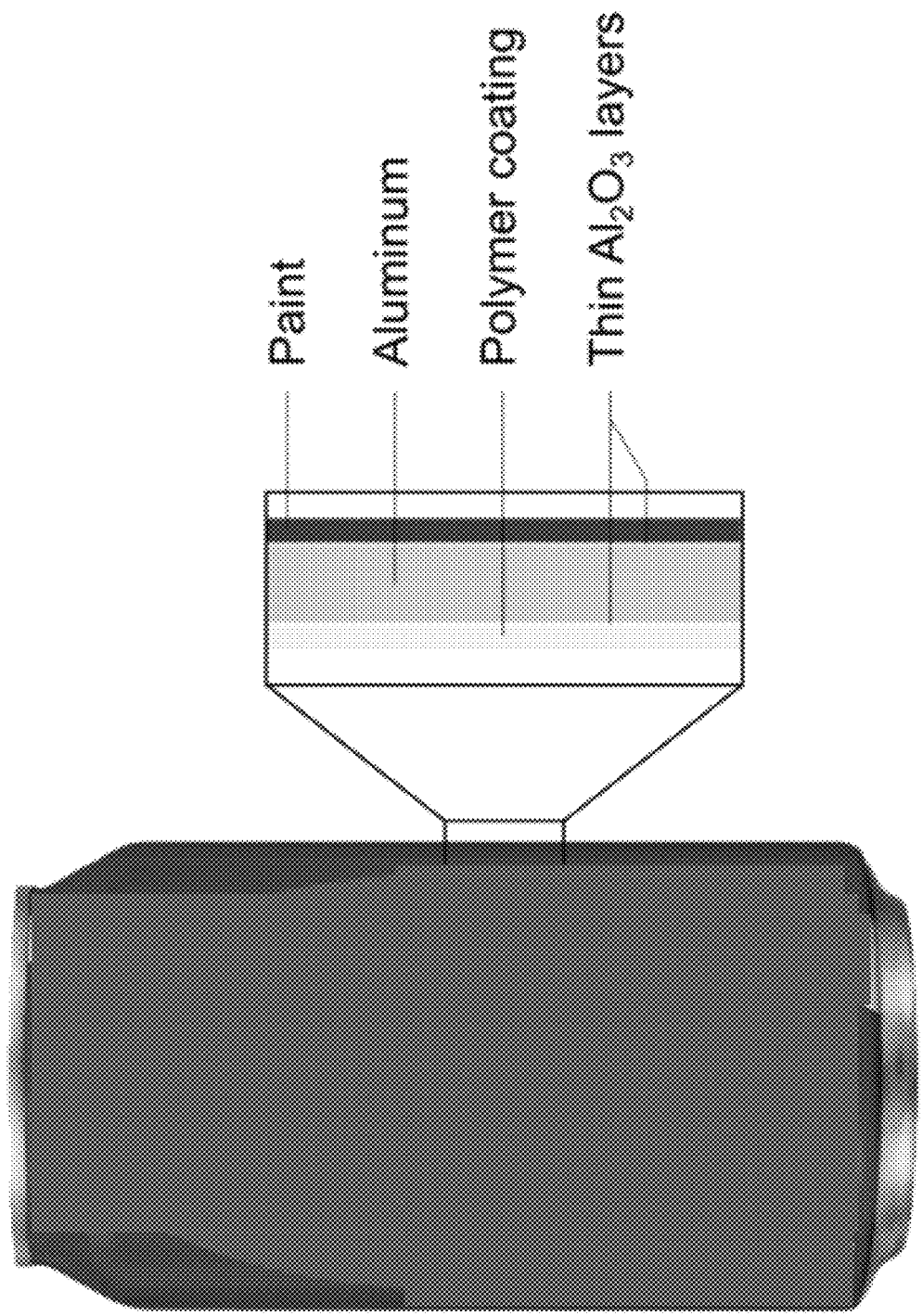
FIG. 4 is a schematic diagram of a scrap aluminum container, according to some embodiments.

FIG. 4 schematically illustrates a piece of scrap aluminum. In the figure, the scrap aluminum is an aluminum container comprising aluminum sandwiched between two layers of aluminum oxide (i.e., $Al_2O_3$). Adjacent to the aluminum oxide is a layer of paint and a polymeric layer. As described above, the articles and methods described herein are capable of penetrating the aluminum oxide, paint, and polymeric layer(s) by mechanical deformation and/or by application of the disclosed gallium and/or indium alloys.

While various embodiments described herein describe processing of scrap aluminum, it should be understood that the articles and methods described herein may be suitable for processing any source of aluminum. In some embodiments, the aluminum comprises pristine aluminum metal. However, in some embodiments, the aluminum comprises scrap aluminum that may have been previously discarded, for example, by user or a consumer. As used herein, scrap aluminum is aluminum which has not been cleaned, substantially preprocessed, or chemically altered from a state it was in when it was discarded. For example, a consumer may drink a beverage contained in an aluminum container and may subsequently discard the aluminum container after consuming the beverage, in which case the discarded aluminum container would be scrap aluminum as used herein. In some such cases, the discarded aluminum container may include trace amounts of the beverage, as well as coatings (e.g., paint, other polymeric coatings), all of which may be penetrated as described elsewhere herein in order to extract the aluminum from the discarded can. One example of such coatings is shown in FIG. 4, where the layers of a discarded aluminum can are schematically illustrated. In the figure, the scrap aluminum can comprises aluminum, as well as layers of aluminum oxide (i.e., $Al_2O_3$) and polymeric coatings adjacent to the aluminum. Additional non-limiting examples of scrap aluminum include aluminum from various aluminum manufacturing processes, for example, chips from subtractive machining, aluminum waste from casting, and aluminum waste from smelting. Scrap aluminum may also be derived from discarded vehicles, electrical cables, buildings, expired infrastructure, drinking cans, packaging, or other articles or devices including aluminum, without limitation.

As described in more detail elsewhere herein, scrap aluminum may be further processed. For example, the scrap aluminum may be ground, shredded, chopped, compressed, or otherwise mechanically deformed and/or compacted. In some embodiments, the scrap aluminum may be derived from two or more sources. For example, scrap metal may comprise discarded aluminum waste from a consumer waste stream (e.g., discarded aluminum cans) and an industrial waste stream (e.g., scrap aluminum from construction) and may be combined (e.g., compressed) for processing and aluminum extraction.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used. Those skilled in the art will recognize or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present disclosure is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Some embodiments may be embodied as a method, of which various examples have been described. The acts performed as part of the methods may be ordered in any suitable way. Accordingly, embodiments may be constructed in which acts are performed in an order different than illustrated, which may include different (e.g., more or less) acts than those that are described, and/or that may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An article comprising:
    a plurality of fragments forming a plurality of layers including at least one layer with a first surface and a second surface opposite the first surface,
    wherein the plurality of layers comprise aluminum and at least one selected from the group of gallium and indium, and
    wherein the plurality of layers include bends such that the plurality of layers are non-planar, and wherein each layer of the plurality of layers is adjacent to and in contact with one or more other layers of the plurality of layers.

2. The article of claim 1, further comprising at least one polymeric coating disposed on the first and/or seconds surface of the at least one layer.

3. The article of claim 2, further comprising a plurality of defects formed in the polymeric coating, wherein at least a portion of the defects are located at the one or more bends, and wherein the defects are permeable to indium and/or gallium.

4. The article of claim 3, wherein the plurality of defects exposes at least a portion of the aluminum of the at least one layer.

5. The article of claim 1, wherein at least a portion of the first surface is adjacent to at least a portion of the second surface.

6. The article of claim 1, wherein plurality of layers forms a tortuous network.

7. The article of claim 1, wherein the at least one layer has an aspect ratio of a length or width to a thickness of the at least one layer of greater than or equal to 1:1.

8. The article of claim 1, further comprising a liquid composition that includes the at least one select from the group of gallium and indium.

9. An article, comprising:
    at least one layer comprising a first surface and a second surface opposite the first surface, wherein the at least one layer comprises aluminum and at least one selected from the group of indium and gallium;
    at least one polymeric coating disposed on the first and/or second surface of the at least one layer; and
    a plurality of defects formed in the at least one polymeric coating.

10. The article of claim 9, wherein the at least one layer comprises one or more bends such that the at least one layer forms a non-planar surface.

11. The article of claim 10, wherein at least a portion of the plurality of defects are located at the one or more bends, and wherein the plurality of defects is permeable to indium and/or gallium.

12. The article of claim 10, wherein the one or more bends is adapted and arranged such that at least a portion of the first surface is adjacent to at least a portion of the second surface.

13. The article of claim 9, wherein the plurality of defects exposes at least a portion of the aluminum of the at least one layer.

14. The article of claim 9, wherein the at least one layer is a plurality of layers that forms a tortuous network.

15. A method of processing aluminum scrap, comprising:
    fragmenting a layer comprising aluminum into a plurality of fragments comprising a first fragment and a second fragment;
    compacting the plurality of fragments to form a pellet, wherein the first fragment and the second fragment are in contact with one another; and
    exposing the pellet to a liquid composition including gallium and/or indium.

16. The method of claim 15, wherein a polymeric coating is disposed on at least one surface of the layer, and wherein compacting the plurality fragments forms defects in the polymeric coating.

17. The method of claim 15, wherein compacting comprises pressing the plurality of fragments in a die.

18. The method of claim 17, wherein a largest average dimension of the plurality of fragments is greater than or equal to twice a cross-sectional transverse dimension of the die.

19. The method of claim 15, wherein exposing the pellet to the liquid composition including gallium and/or indium occurs at a temperature of greater than or equal to 100° C.

20. The method of claim 15, wherein the plurality of fragments comprises flakes and/or ribbons of aluminum metal.

21. The method of claim 15, wherein the pellet comprises a plurality of layers that forms a tortuous network.

* * * * *